United States Patent
Xiao et al.

(10) Patent No.: US 10,024,697 B2
(45) Date of Patent: Jul. 17, 2018

(54) METHOD AND SYSTEM USING WAVELENGTH DIVISION MULTIPLEXING FOR ELIMINATING AND REDUCING LIGHT DIFFUSION AND LIGHT REFLECTION INTERFERENCE IN INTERFERENCE PATH

(71) Applicant: FUDAN UNIVERSITY, Shanghai (CN)

(72) Inventors: Qian Xiao, Shanghai (CN); Bo Jia, Shanghai (CN); Pang Bian, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 15/028,865

(22) PCT Filed: Oct. 10, 2014

(86) PCT No.: PCT/CN2014/088326
§ 371 (c)(1),
(2) Date: Apr. 12, 2016

(87) PCT Pub. No.: WO2015/051758
PCT Pub. Date: Apr. 16, 2015

(65) Prior Publication Data
US 2016/0252371 A1    Sep. 1, 2016

(30) Foreign Application Priority Data
Oct. 12, 2013    (CN) .......................... 2013 1 0473672

(51) Int. Cl.
*G01D 5/353*    (2006.01)
*G01M 5/00*    (2006.01)
(Continued)

(52) U.S. Cl.
CPC ..... *G01D 5/35387* (2013.01); *G01D 5/35358* (2013.01); *G01M 5/0025* (2013.01);
(Continued)

(58) Field of Classification Search
CPC ........... G01D 5/35387; G01D 5/35358; G08B 13/124; G01M 5/0091; G01M 5/0025; G02B 6/2861
See application file for complete search history.

(56) References Cited

U.S. PATENT DOCUMENTS 4,973,169 A * 11/1990 Slonecker .............. G02B 6/274
                                                                    385/1
5,160,976 A * 11/1992 Carr .......................... G01P 5/26
                                                                    356/28.5
(Continued)

FOREIGN PATENT DOCUMENTS

CN    102003971    4/2011
CN    102064884    5/2011
(Continued)

OTHER PUBLICATIONS

English machine translation of Sun et al. (CN 102322879) Jan. 18, 2012.*
(Continued)

*Primary Examiner* — Dominic J Bologna
(74) *Attorney, Agent, or Firm* — Hamre, Schumann, Mueller & Larson, P.C.

(57) ABSTRACT

A method using wavelength division multiplexing for reducing light diffusion and light reflection interference in an interference path, comprising: connecting a wavelength division multiplexer (10) serially at an end of a sensing optical fiber (6); using the wavelength division multiplexer (10) to extract a wavelength component from a working path for measuring an interfering signal caused by light diffusion and light reflection; using the signal as a reference to extract an effective signal component that has been interfered by light diffusion and light reflection, and obtaining a pure effective signal. Because the device connected at the end of the sensing optical fiber (6) is passive and requires no power, (Continued)

the system is easy to implement and is particularly suitable for situations in which power provision is difficult at the end of the sensing optical fiber (6). The method is suitable for long distance pipeline monitoring and a wide-range optical of fiber perimeter security. Also provided is a system using wavelength division multiplexing for reducing light diffusion and light reflection interference in an interference path.

3 Claims, 3 Drawing Sheets

(51) Int. Cl.
*G08B 13/12* (2006.01)
*G02B 6/28* (2006.01)

(52) U.S. Cl.
CPC ......... *G01M 5/0091* (2013.01); *G08B 13/124* (2013.01); *G02B 6/2861* (2013.01)

(56) References Cited

U.S. PATENT DOCUMENTS

| | | | |
|---|---|---|---|
| 6,490,045 | B1 | 12/2002 | Dakin et al. |
| 2005/0088727 | A1* | 4/2005 | Nakashima .......... H04B 10/291 359/341.41 |

FOREIGN PATENT DOCUMENTS

| | | |
|---|---|---|
| CN | 102117525 | 7/2011 |
| CN | 102322879 | 1/2012 |
| CN | 202101683 | 1/2012 |
| CN | 102496231 | 6/2012 |
| CN | 103487067 | 1/2014 |

OTHER PUBLICATIONS

International Search Report for international application No. PCT/CN2014/088326, dated Jan. 21, 2015 (6 pages).

\* cited by examiner

METHOD AND SYSTEM USING WAVELENGTH DIVISION MULTIPLEXING FOR ELIMINATING AND REDUCING LIGHT DIFFUSION AND LIGHT REFLECTION INTERFERENCE IN INTERFERENCE PATH

TECHNICAL FIELD

The present invention belongs to the field of optical fiber sensing technology, and in particular to eliminating the impact of backscattered light in an optical fiber sensor.

BACKGROUND

Optical fiber sensing technology is often used in large-scale, long-distance monitoring, such as security monitoring used in oil pipelines, high-voltage power grids, pipelines, communications cable and other infrastructure. A fiber is used as a sensor to acquire a related disturbance signal in real-time, and a location of the disturbance is determined by analyzing characteristics of light produced by the optical fiber. The structure of a single core feedback optical path is, using a single fiber as sensing fiber, has the fiber itself not closed, and only has a feedback device, such as a mirror, at an end of the fiber constituting an interference optical path. In practice, this structure laying is flexible. The characteristic of such monitoring systems that the light carrying the disturbance information is the light which is transmitted to the end of the fiber, and then reflect by feedback device.

The following is positioning technology of a single core feedback positioning system.

As shown in FIGS. 1 and 2, a sensing section for an optical fiber (optical cable) 1 is at a starting point of the optical fiber (optical cable), and a feedback device 2, such as a mirror, is at an end of the sensing section. Incident light retraces via the feedback device 2. For example, when a disturbance occurs at at point D, whose modulation of a light phase is φ(t), and when the light travels through the disturbance point D, the resulting phase modulation would be $$\varphi_1(t)=\varphi(t)+\varphi(t-T)$$

wherein, $T=2n_{eff} L/c \cdot L$ being the distance between the disturbance point D and the feedback device 2, c being the speed of light in vacuum, and $n_{eff}$ being the effective refractive index of the optical fiber.

As shown in FIG. 2, we configure an interference optical path.

The interference optical path includes the following parts: a N*M coupler 3, where N and M are integers; a P*Q coupler 4, where P and Q are integers; optical fiber delayer 5 having a delay of, for example, τ; an optical fiber (optical cable) 6; and a feedback device 2. 3a1, 3a2, ..., 3aN, 3b1, 3b2 are ports of the coupler 3. 3a1, 3a2, ..., 3aN are co-rotating ports (with a total of N) of the coupler 3. 3b1, 3b2 are two ports in another group co-rotating ports (with a total of M) of the coupler 3. 4a1, 4a2, 4b1 are ports of the coupler 4. 4a1, 4a2 are two ports in a group co-rotating ports (with a total of P) of coupler 4. 4b1 is a port in another group co-rotating ports (with a total of Q) of the coupler 4. The optical fiber 6 is a sensing optical fiber. The feedback device 2 makes the light transmitted along the fiber go back through the fiber 6 and return to the coupler 4. A light source is input through the port 3a1 of coupler 3, and after splitting in coupler 3, is output respectively through the ports 3b1, 3b2 after being split in the coupler 3. The two optical paths are:

I: 3b1→5→4a1→4b1→6→2→6→4b1→4a2→3b2
II: 3b2→4a2→4b1→6→2→6→4b1→4a1→5→3b1

The two optical paths join at the coupler 3 again and generate interference, and interference signals are output respectively through the ports 3a1, 3a2, 3aN.

In the interference optical path, the light first enters the delayer 5 and then enters fiber cable 6, and phase modulation applied to the light is:

$$\varphi_2(t)=\varphi(t-\tau)+\varphi(t-\tau-T)$$

A phase difference between the two coherent interference lights is:

$$\Delta\varphi=[\varphi(t)+\varphi(t-T)]-[(\varphi(t-\tau)+\varphi(t-\tau-T)]$$

In a spectrum of the phase difference, there is a frequency drop point or "notch point". The location of the disturbance can be determined based on the notch point. For example, the "Notch point" is shown in FIG. 3, and in this amplitude—frequency diagram obtained by a time-frequency transformation, "O"s mark the notch point. A relationship between the notch point and the disturbance position is:

$$f_{null}(k) = \frac{k}{2} \cdot \frac{c}{2n_{eff}L},$$

$$(k = 2n-1, n \in N)$$

wherein, $f_{null}(k)$ is frequency of a k-order notch point.

We can see from the above relationship that the coherent light must transmit from the endpoint 1 of the sensing optical fiber 6 to the endpoint 2 and then return to sensing optical fiber 6 in order to carry the position "L" message. However, in practice, due to the structural characteristics of the optical fiber and defects in the optical fiber itself and other reasons, scattered light, such as Rayleigh scattered light and the like, occurs in the optical fiber 6.

As shown in FIG. 4, 7 is a scattering point, a backscattered light goes back to interference structure along the optical cable 6, and therefore there are two beams of light:

I: 3b1→5→4a1→4b1→6→7→6→4b1→4a2→3b2
II: 3b2→4a2→4b1→6→7→6→4b1→4a1→5→3b1

Because of similar spectral characteristics, the optical paths are equal without a disturbance, and therefore join at the coupler 3 again and will generate interference. Obviously, the information carried by the two beams of interference lights is a length $L_7$ between the point 7 and the disturbance point D. 8 is another scattering point, the length information carried by an interference formed by backscattering is a length $L_8$ between the point 8 and the disturbance point D, and apparently, $L_7 \neq L_8 \neq L$, since these interferences are mixed at the output. Interference light generated by Brillouin scattering or Raman scattering can be filtered out by an optical filter. However, interference light generated by Rayleigh scattering or interference light generated by a contact point of an optical path, cannot be eliminated by an optical filtering method, which will affect the purity of the useful interference signal, and will directly affect the accuracy of the disturbance L position. Generally, the intensity of an interference generated by backscattered light or a contact is significantly less than the intensity of an interference generated by reflected light (effective interference signal), such that it will not have a significant impact on the effective interference signal, and the accuracy of L can meet the actual needs. But after a monitoring circuit reaches a certain length, and as the scattered light affects the entire line, obvious interference signal distortion is observed and the system cannot obtain a valid interference signal normally. The acquired signal contains not only effective interference signal but also contains a spurious interference signal caused by scattered light.

Similarly, a reflection by a contact point of an optical path can also cause the same adverse effect on the interference signal.

The impact of the scattered (reflected) light in the conventional path is not only the obvious restriction in monitoring system, but also when a large scattering (reflecting) point exists, the system cannot properly perform a test of an optical fiber.

In order to cut the impact of the signal, the invention CN 201010508357.2 (FIG. 5) proposed using the phase generated carrier technology to separate the effective interference phase information from the optical output which is mixed with backscattered light, contact point reflected light interference signal to obtain a pure signal having effective disturbance position information, so as to achieve the purpose of eliminating the impact of back scattered light and the like. In this technology, a phase modulator 9 is positioned close to the feedback device 2 located at the end of the sensing optical fiber (optical cable) 6, and a modulation signal is applied to phase modulator 9. Accordingly, the backward transmitting light is scattered (reflected) by a scattering (reflecting) point (such as scattering points 7,8) and does not reach the feedback device 2 at the end of the sensing optical fiber 6, and its signal is not modulated because not passing through the phase modulator 9. The effective light is reflected by the feedback device 2 and reaches the end and its signal is modulated to a sideband of a fundamental frequency or a double frequency of the modulation frequency which the scattered interference signal cannot reach because of the phase modulator 9, and is separated with the scattered light signals. The extraction of the effective light information can be achieved by corresponding signal processing means, so as to avoid the interference of the scattered light. Since the described technique connects the phase modulator 9 in series with the end of the sensing optical fiber 6, the optical path is phase-modulated and an electrical signal is applied to the modulation signal Therefore, the means connected to the end of sensing optical fiber is an active device that requires power. It is difficult to provide power to the end of sensing optical fiber, therefore the application of the method is limited.

SUMMARY OF THE INVENTION

The purpose of the present invention is to provide a method providing no power to an end of a sensing optical fiber and eliminating the impact of a backscattered light in an optical fiber sensor.

The present invention uses wavelength division multiplexing technology to obtain an interference signal produced by an independent scattered light, so as to obtain a pure active signal from an interference output signal affected by the interference signal. The present invention is improvement to the system shown in FIG. 5, which connects a WDM (wavelength division multiplexer) in series at an end of a sensing optical fiber. The WDM will be used to separate a wavelength component from the working path for measuring an interference signal produced by the scattered light, and the signal is used as a reference to extract an effective signal component, which interference with by the scattered light, and obtain a clean valid signal. This method involves a simple structure, since the end of the sensing fiber includes an active device, so that the structure of this method is simple and easier to implement. Specific methods are as follows.

The basic interference optical path structure of the system of the present invention is shown in FIG. 4. In the original optical path structure shown in FIG. 5, a phase modulator 9 is connected at the end of the sensing optical fiber 6 and close to the feedback device 2, but in the present invention a WDM 10 is connected in series between the end of the sensing optical fiber 6 and the feedback device 2. The WDM 10 is provided with a multiplexed port 10a and two splitting ports 10b, 10c; corresponding wavelengths of these two splitting ports 10b, 10c are λ1, λ2, respectively. The multiplexed port 10a is connected with the end of the sensing optical fiber 6, and the splitting port 10b is connected with the feedback device 2. Thus, the end of the splitting port 10c is not used. An exemplary optical connect structure is shown in FIG. 6.

In the above optical structure, when the light with wavelength λ1 is transmitting along the sensing optical fiber 6 to an end of the feedback device 2, a part of the light is affected by a scattering (reflecting) point and returns in advance, the remaining light after passes through the WDM 10 and reaching the feedback device 2, then returns along the same route. Therefore, the signal $P_1$ formed by wavelength λ1 can be expressed as:

$$P_1 = P_{\mathit{eff}} + \sum_i p_S(\lambda_1, i) \quad (1)$$

$P_{\mathit{eff}}$ is a signal formed by being reflected by the feedback device 2. $p_S(\lambda_1, i)$ is a signal formed by light with wavelength λ1 caused by the i-th scattering (reflecting) point of the sensing optical fiber 6.

$$\sum_i p_S(\lambda_1, i)$$

is a sum of all of the scattering (reflecting) points along the sensing optical fiber 6 before the WDM 10. When the light with wavelength λ2 is transmitting along the sensing optical fiber 6 to the end of the feedback device 2, a part of the light is affected by a scattering (reflecting) point and returns in advance, and the remaining light is passing through the WDM 10 and leaks from the port 10c. Therefore, the signal $P_2$ formed by wavelength λ2 can be expressed as:

$$P_2 = \sum_i p_S(\lambda_2, i) \quad (2)$$

$p_S(\lambda_2, i)$ is a signal formed by the light with the wavelength λ2 caused by the i-th scattering reflecting point of the sensing optical fiber 6.

When λ1 is close to λ2:

$$p_S(\lambda_1, i) \approx p_S(\lambda_2, i) \quad (3)$$

$$\sum_i p_S(\lambda_1, i) \approx \sum_i p_S(\lambda_2, i) \quad (4)$$

Thus, the signals $P_1$, $P_2$ are formed by wavelength $\lambda 1$, $\lambda 2$, and by using a certain signal processing means, for example, adaptive algorithms, etc., the interference signal component can be removed and an effective signal $P_{eff}$ is obtained.

The light injected into the optical fiber optical path structure of the present invention can be provided by an independent source, or the light source may be a combination of two or more different wavelengths of light through the WDM; WDM can have two splitting ports or a plurality of splitting ports.

An advantage of the present invention is that it can effectively eliminate the impact of backscattered (reflected) light in single core optical fiber sensing light path, and the useful information is extracted from a signal of serious disturbances, which significantly improves a measurement distance and enhances the adaptability of an interference measurement system to a line. The technology uses a WDM to obtain an interference signal formed by scattered (reflected) light, so that the structure of this method is simple and easier to implement. Because the method uses passive components, an advantage of providing no power to an end connector of a sensing optical fiber of a single feedback optical fiber sensing structure is maintained, which is especially advantageous for a location which is difficult to provide power, so as to have a wider range of adaptability. A free extending layout of the end of the monitoring optical fiber is easier to be achieved.

Distributed optical fiber line monitoring system of the invention can be widely used in a long distance monitoring of safety monitoring in the field of telecommunications lines, power transmission lines, gas pipelines, oil pipelines, border; and can also be used for safety monitoring of large buildings such as dams, tunnels, mines, etc.

REFERENCE NUMERALS

1: end of a sensing optical fiber 6. 2: feedback device. 3: N*M (N, M are integers) coupler. 4: P*Q (P, Q are integers) coupler. 5: optical fiber delayer (having delay T). 6: a sensor optical fiber (optical cable) having the feedback device 2. 3a1, 3a2, 3aN, 3b1, 3b2: ports of the coupler 3; 3a1, 3a2, 3aN are co-rotating ports in a group of co-rotating ports (with a total of N ports) of the coupler 3; 3b1, 3b2 are two ports in another group of co-rotating ports (with a total of M) of the coupler 3. 4a1, 4a2, 4b1: ports of the coupler 4; 4a1, 4a2 are two ports in a group of co-rotating ports (with a total of P) of the coupler 4; 4b1 is a port in another group of co-rotating ports (with a total of Q) of the coupler 4. 7, 8: scattering points in the optical fiber. 9: phase modulator. 10: WDM connected to the end of the sensing optical fiber; 10a: multiplexed port; 10b, 10c: splitting ports. 11: WDM; 11a: multiplexed port; 11b, 11c: splitting ports. 12: WDM; 12a: multiplexed port; 12b, 12c: splitting ports. 13: WDM; 13a: multiplexed port; 13b, 13c: splitting ports.

EMBODIMENT

Figure 1:
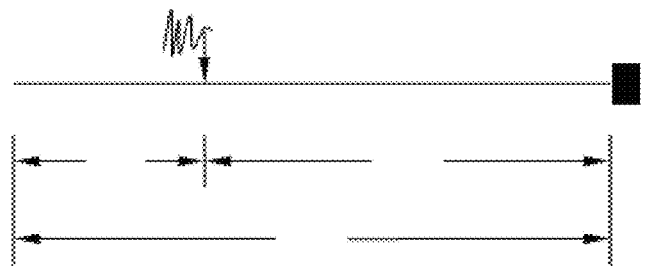
FIG. 1 is a positioning schematic diagram of a single core feedback sensor.
Figure 2:
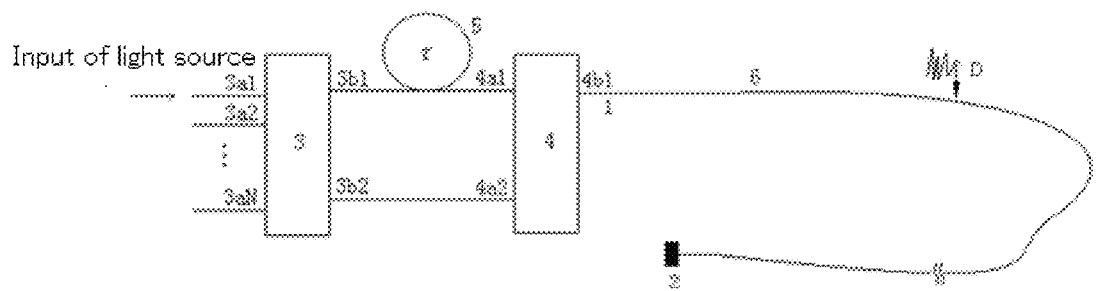
FIG. 2 is a diagram of a single core feedback interference structure.
Figure 3:
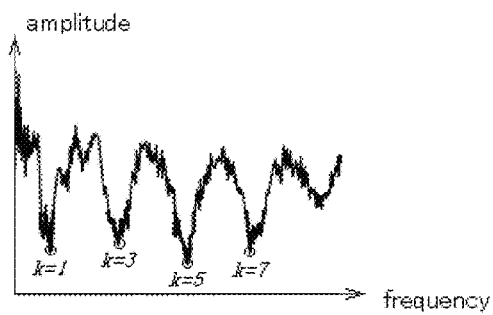
FIG. 3 is a spectrum of the phase signal demodulated from an interference signal, "O" is a frequency "notch point."
Figure 4:
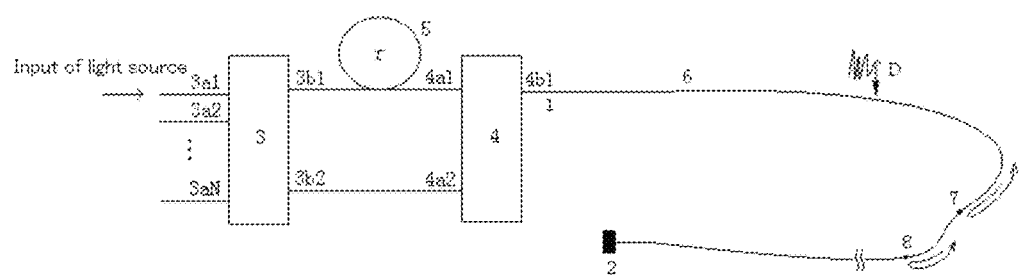
FIG. 4 is a schematic diagram of an impact caused by backscattered light.
Figure 5:
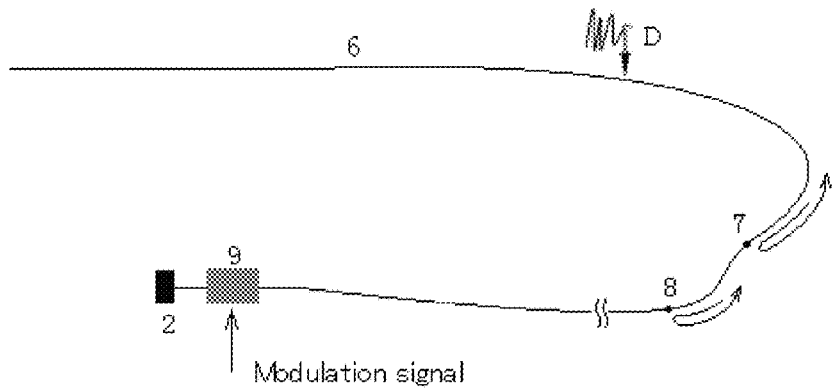
FIG. 5 is a diagram of a light path connection method which uses a phase generated carrier technology to eliminate an impact of backscattering.
Figure 6:
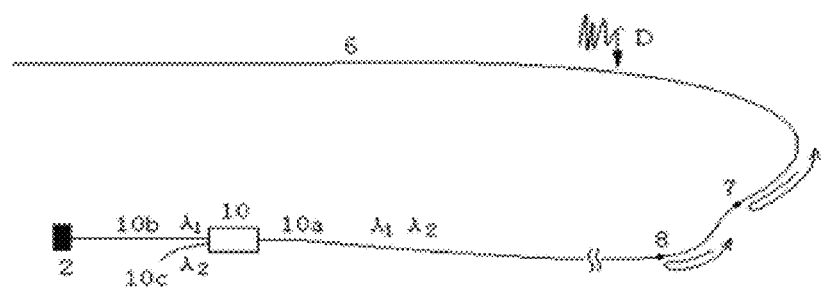
FIG. 6 is a diagram of a light path connection method which uses WDM technology to eliminate an impact of backscattering.
Figure 7:
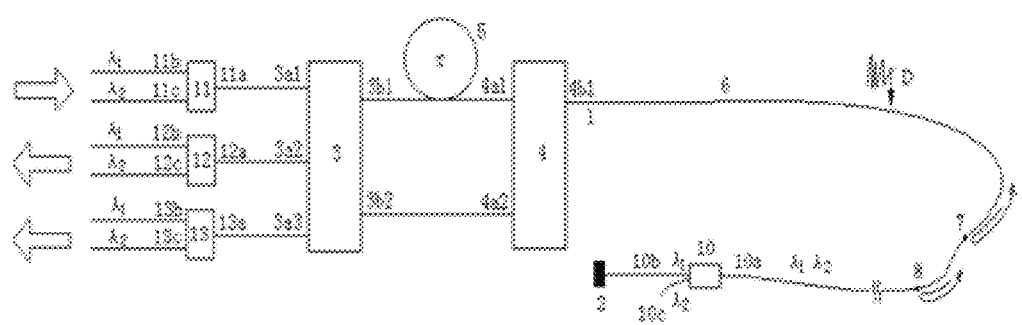
FIG. 7 is a concrete construction in which a method of the present invention may be implemented.

A measurement system of an embodiment uses an interference structure shown in FIG. 2. The coupler 3 uses an average 3*3 Optical Fiber tapered single mode coupler. The coupler 4 uses an average of 2*2 Optical Fiber tapered single mode coupler. A WDM is a three-port device and has two splitting ports, and the wavelengths corresponding to the two splitting ports are 1310 nm and 1550 nm, respectively. 11 is a WDM having a multiplexed port 11a and splitting ports 11b, 11c. 12 is a WDM having a multiplexed port 12a, and splitting ports 12b, 12c. 13 is a WDM having a multiplexed port 13a and splitting ports 13b, 13c. Optical inputs, which each provide a wavelength of light, $\lambda 1=1310$ nm and $\lambda 2=1550$ nm, respectively, are respectively connected to ports 11b, 11c of WDM 11 and are injected into the port 3a1 of the coupler 3 through port 11a. The lights output from the ports 3a2, 3a3 are injected into the corresponding ports 12a, 13a of WDMs 12, 13, and corresponding lights with 1310 nm components are output from ports 12b, 13b, and corresponding lights with 1550 nm components are output from ports 12c, 13c. Lights output from the ports 12c, 13c are interference signals generated by a scatted (reflected) light, and lights output from the ports 12b, 13b are active interference signal affected by signals generated by a scatted (reflected) light.

Light source is S03-B type super radiation diode (SLD) produced by 44 research institute of Industrial Electronics Group Corporation. The coupler 4 uses an average 2*2 Optical Fiber tapered single mode coupler. Both of them are produced by Wuhan Research Institute of Posts and Telecommunications. Fiber used by a fiber delayer is G652 single-mode fiber. A photoelectric converter used in photoelectric conversion and information processing is GT322C500 type InGaAs photodetector produced by 44 research institute. The Feedback device 2 is produced by steaming aluminum at an optical fiber end, whose reflectance is greater than 95%. The WDM 10 is a FBT single-mode device.

In the single core sensing path, an active joint connection point is 10 km from an end of the sensing optical cable 6 (feedback device 2), at which a point reflection is >2 dB, and a disturbance is applied near the port 4b1 to the sensing cable 6. If the method of the invention is not used, the system cannot properly perform positioning. After using the WDM technology in an embodiment, the system can locate accurately.

The invention claimed is:

1. A method using wavelength division multiplexing for eliminating and reducing light diffusion and light reflection interference in an interference path, the method comprising:
connecting a wavelength division multiplexer ("WDM") in series between an end of a sensing optical fiber and a feedback device in an interference optical path structure;
providing the WDM with a multiplexed port, a first splitting port, and a second splitting port, corresponding wavelengths of light from the first and second splitting ports being $\lambda 1$ and $\lambda 2$, respectively;

connecting the multiplexed port with the end of the sensing optical fiber; and connecting the first splitting port with the feedback device and not using the second splitting port, wherein an interference optical path structure is configured such that:
- light with wavelength λ2, when transmitted along the interference path, obtains an interference signal produced by one or more scattering points and reflecting points that are along the interference path, and
- light with wavelength λ1, when transmitted along the interference path, obtains both an effective signal of a disturbance point and the interference signal.

2. The method according to claim 1, wherein, when light with the wavelength λ1 is transmitting along the sensing optical fiber to an end of the feedback device:
- a part of the light is scattered by scattering or reflected by a reflection point and returns in advance, and
- the remaining light passes through the WDM, reaches the feedback device, and then returns along the same route such that a signal $P_1$ formed by wavelength λ1 is expressed as:

$$P_1 = P_{\textit{eff}} + \sum_i p_S(\lambda_1, i) \qquad (1)$$

wherein, $P_{\textit{eff}}$ is a signal formed by light reflected by the feedback device, $p_S(\lambda_1, i)$ is a signal formed by the light with wavelength λ1 caused by an i-th scattering point or reflecting point of the sensing optical fiber, and $$\sum_i p_S(\lambda_1, i)$$

is a sum of all scattering and reflecting points along the sensing optical fiber before the WDM, and when light with wavelength λ2 is transmitting along the sensing optical fiber to the end of the feedback device:
- a part of the light is scattered by the scattering point or reflected by the reflecting point and returns in advance, and
- the remaining light passes through the WDM and leaks from the second splitting port such that a signal $P_2$ formed by wavelength λ2 is expressed as:

$$P_2 = \sum_i p_S(\lambda_2, i) \qquad (2)$$

wherein, $p_S(\lambda_2, i)$ is a signal formed by the light with wavelength λ2 caused by an i-th scattering point or reflecting point of the sensing optical fiber, and the method further comprising:

using signal processing to make λ1 close to λ2 such that:

$$p_S(\lambda_1, i) \approx p_S(\lambda_2, i) \qquad (3)$$

$$\sum_i p_S(\lambda_1, i) \approx \sum_i p_S(\lambda_2, i) \qquad (4)$$

removing an interference signal component and obtaining the effective signal.

3. A system using wavelength division multiplexing for eliminating and reducing light diffusion and light reflection interference in an interference path, the system comprising:
- an interference optical path structure including a sensing optical fiber and a feedback device; and
- a wavelength division multiplexer ("WDM") connected in series between an end of the sensing optical fiber and the feedback device, wherein the WDM includes a multiplexed port, a first splitting port, and a second splitting port, corresponding wavelengths of light from the first and second splitting ports being λ1 and λ2, respectively;

the multiplexed port is connected with the end of the sensing optical fiber, the first splitting port is connected with the feedback device, and an end of the second splitting port is not used, and the system is configured such that:
- light with wavelength λ2, when transmitted along the interference path, obtains an interference signal produced by one or more scattering points and reflecting points that are along the interference path, and
- light with wavelength λ1, when transmitted along the interference path, obtains both an effective signal of a disturbance point and the interference signal.

* * * * *